US009524395B2

(12) United States Patent
Selander et al.

(10) Patent No.: US 9,524,395 B2
(45) Date of Patent: Dec. 20, 2016

(54) APPARATUS AND METHODS FOR OBTAINING A PASSWORD HINT

(75) Inventors: Göran Selander, Bromma (SE); Mats Näslund, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 8 days.

(21) Appl. No.: 14/356,561

(22) PCT Filed: Nov. 8, 2011

(86) PCT No.: PCT/SE2011/051334
§ 371 (c)(1),
(2), (4) Date: May 6, 2014

(87) PCT Pub. No.: WO2013/070124
PCT Pub. Date: May 16, 2013

(65) Prior Publication Data
US 2014/0289870 A1 Sep. 25, 2014

(51) Int. Cl.
G06F 21/00 (2013.01)
G06F 21/62 (2013.01)
G06F 21/46 (2013.01)

(52) U.S. Cl.
CPC ............... G06F 21/62 (2013.01); G06F 21/46 (2013.01); G06F 2221/2131 (2013.01)

(58) Field of Classification Search
CPC .. G06F 21/31; G06F 21/46; G06F 2221/2131; G06F 21/62
USPC .......................................................... 726/28
See application file for complete search history.

(56) References Cited

U.S. PATENT DOCUMENTS

| 5,465,084 A | 11/1995 | Cottrell |
| 6,643,784 B1* | 11/2003 | McCulligh ...................... 726/18 |
| 7,363,585 B1* | 4/2008 | Sierra et al. ................... 715/710 |
| 2004/0139331 A1* | 7/2004 | Sanai et al. .................... 713/184 |
| 2009/0133120 A1 | 5/2009 | Cannizzaro et al. |
| 2011/0187497 A1* | 8/2011 | Chin ........................... 340/5.54 |

FOREIGN PATENT DOCUMENTS

| WO | WO 2007/038924 A1 | 4/2007 |
| WO | WO 2007038924 A1 * | 4/2007 |

OTHER PUBLICATIONS

International Search Report, PCT Application No. PCT/SE2011/051334, Oct. 11, 2012.
Written Opinion of the International Searching Authority, PCT Application No. PCT/SE2011/051334, Oct. 11, 2012.

(Continued)

Primary Examiner — Yogesh Paliwal
(74) Attorney, Agent, or Firm — Myers Bigel, P.A.

(57) ABSTRACT

A method and apparatus for obtaining a password hint is disclosed. In some embodiments, the method includes: receiving a spatial pattern from a user; obtaining a password comprising a plurality of characters; obtaining a password hint comprising an arrangement of characters, wherein the arrangement of characters includes the plurality of characters of the password and additional characters, and the plurality of characters of the password are located within the arrangement of characters according to the received spatial pattern. The method may also include storing the password hint or providing the password hint to the user.

20 Claims, 12 Drawing Sheets

(56) References Cited

OTHER PUBLICATIONS

Kumar et al.: "PassPattern System (PPS): A Pattern-Based User Authentication Scheme" *Networking 2008 Ad Hoc and Sensor Networks Wireless Networks, Next Generation Internet Lecture Notes in Computer Science*, vol. 4982, 2008, pp. 162-169, XP019088829.
Suo et al.: "Graphical Passwords: A Survey" *Proceedings of the 21st Annual Computer Security Applications Conference (ACSAC 2005)*, Dec. 2005, 10 pp.—472, XP002563771.
Zheng et al.: "A Stroke-Based Textual Password Authentication Scheme" *2009 First International Workshop on Education Technology and Computer Science*, vol. 3, Mar. 7, 2009, pp. 90-95, XP031458921.
Extended European Search Report, PCT Application No. PCT/SE2011/051334, Jun. 30, 2015.

\* cited by examiner storage medium 943 a set of instructions for receiving password requirements
1005 a set of instructions for obtaining a password
1010 a set of instructions for prompting a user for a spatial pattern
1015 a set of instructions for receiving a spatial pattern
1020 a set of instructions for determining whether a received pattern meets one or more pattern requirements
1025 a set of instructions for generating a password hint
1030 a set of instructions for providing a password hint to the user
1035

*FIG. 10*

APPARATUS AND METHODS FOR OBTAINING A PASSWORD HINT

CROSS REFERENCE TO RELATED APPLICATION

This application is a 35 U.S.C. §371 national stage application of PCT International Application No. PCT/SE2011/051334, filed on 8 Nov. 2011, the disclosure and content of which is incorporated by reference herein in its entirety. The above-referenced PCT International Application was published in the English language as International Publication No. WO 2013/070124 A1 on 16 May 2013.

TECHNICAL FIELD

Embodiment relate to systems and methods for providing a password hint.

BACKGROUND

User authentication is an important requirement for many systems. For example, a software application may host different respective accounts for different users and require a user to authenticate his identity as a condition of granting the user access to his account. Internet applications, for example, are often shared by millions of different users and typically require each user to authenticate his identity (e.g., by providing authenticating credentials) as a precondition of gaining access to the user's account. Although authentication is often used to verify a user's specific identity, the process may be more generally thought of as verification that a user possesses a certain set of one or more privileges.

Many authentication procedures rely on a user's ability to reproduce a password. For example, many network services (e.g., web applications) authenticate users with a login procedure that requires the user to reproduce a username and password combination. Access to corporate facilities and other facilities and services may require the user to reproduce a password and personal identification number (PIN) combination and/or proof of possession of some physical token (e.g., public/private key, access/payment smart card, certificate, etc.). Many other variations exist.

Password-based authentication schemes are susceptible to attackers who are able to guess a user's password. For example, if the user has chosen a "weak" password (e.g., one with few characters), a brute force attacker may discover the password by repeatedly guessing passwords and attempting to authenticate.

To thwart attackers, it may be desirable that users select "strong" passwords that are difficult to guess. A password may be strong because it is composed of many characters and/or many types of characters chosen from a large character set. Such passwords may be referred to as "high-entropy." Weaker, "low-entropy" passwords may include fewer characters and/or fewer types of characters that may be chosen from a smaller character set.

To ensure high-entropy passwords, some systems impose password requirements (i.e., password policies) that prevent users from creating passwords that are too weak. Such requirements may include a minimum number of characters, maximum number of repeated characters, characters from several sets, no dictionary words, and other such requirements. Such minimum requirements for the complexity of a password may be referred to herein without distinction as password requirements or password policy.

Although high-entropy passwords may be desirable from a security perspective, such passwords are difficult to remember. As a result, users may select low-entropy passwords or select the same high-entropy password for multiple systems. Additionally, users may record their passwords, such as on paper or in a computer file. Unfortunately, all of these approaches compromise system security by making it easier for attackers to guess or steal a user's password.

SUMMARY

A password hint method and apparatus is disclosed. In some embodiments, the system may generate (other otherwise obtain) a password (e.g., a high-entropy password) and a password hint that enables the user to recall the password. For example, in some embodiments, when the user requires a new password (e.g., for use with a password-protected web application), the user may invoke the password hint system and provide the system with a spatial pattern. The system may then obtain (e.g., generate) a strong password and provide the user with a password hint based on the spatial pattern. The user may store the password hint and retrieve it when he wishes to recall the password.

In some embodiments, a method for obtaining a password hint may include receiving a spatial pattern from a user and obtaining a password comprising a plurality of characters. The method may also include obtaining a password hint comprising an arrangement of characters that includes the plurality of characters of the password and additional characters. The plurality of characters of the password may be located within the arrangement of characters according to the received spatial pattern. The method may also include storing for the user, or providing to the user, the password hint. For example, the method may also include storing for the user, or providing to the user, the arrangement of characters or hint information from which the arrangement of characters may be generated.

In some embodiments, the method also includes receiving password requirements, and the step of obtaining the password comprises generating the password in accordance with the received requirements. In such embodiments, the method may further include the step of receiving an indication of a network service for which the password is intended; and requesting the password requirements from the indicated network service.

In some embodiments, the step of storing the password hint comprises storing the password hint in association with a network service to which the password corresponds or in association with a target authentication system to which the password corresponds.

In some embodiments, the step of storing for the user, or providing to the user, the password hint consists of storing or providing: (a) the arrangement of characters or (b) hint information from which the arrangement of characters can be generated. The arrangement of characters or the hint information from which the arrangement of characters can be generated may stored in a local storage of a mobile device or may be stored using a second network service. If the latter, the method may further include the step of receiving, by the second network service, a request indicating that a user desires to access the stored password hint, wherein the request was transmitted by a mobile communication device. In response to receiving the request, the second network service may grant access to the stored password hint if the mobile communication device has been authenticated using a subscriber identity module of the mobile communication device.

In some embodiments, the method may include using a graphical image to prompt the user for the spatial pattern, and the password hint comprises the graphical image. In such embodiments, the password hint may include the arrangement of characters superimposed on the graphical image.

In some embodiments, the method further includes providing the password hint to the user automatically in response to detecting that the user is being prompted to input a password associated with the password hint. In some embodiments, the method also includes automatically using the password to authenticate the user to a network service associated with the password in response to obtaining the password.

In some embodiments, the method (or certain steps thereof) may be performed by a mobile communication device.

In some embodiments, the method may also include: receiving an initial spatial pattern that is distinct from the spatial pattern; determining that the initial spatial pattern does not meet one or more pattern requirements; and prompting the user to input another spatial pattern in response to determining that the initial pattern does not meet the one or more pattern requirements, wherein the step of receiving the first recited spatial pattern occurs after the step of prompting the user to input another spatial pattern.

In another aspect, an apparatus for obtaining a password hint is provided. In some embodiments, the apparatus includes: a processor and memory coupled to the processor. The memory stores program instructions for obtaining a password comprising a plurality of characters and generating a password hint comprising an arrangement of characters. The arrangement of characters includes the plurality of characters of the password and additional characters, and the plurality of characters of the password are located within the arrangement of characters according to a spatial pattern selected by a user. The memory also stores program instructions for storing for the user, or providing to the user, the password hint.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 10 is a block diagram illustrating a storage medium storing computer readable program code (CRPC), according to some embodiments.

DETAILED DESCRIPTION

Figure 1:
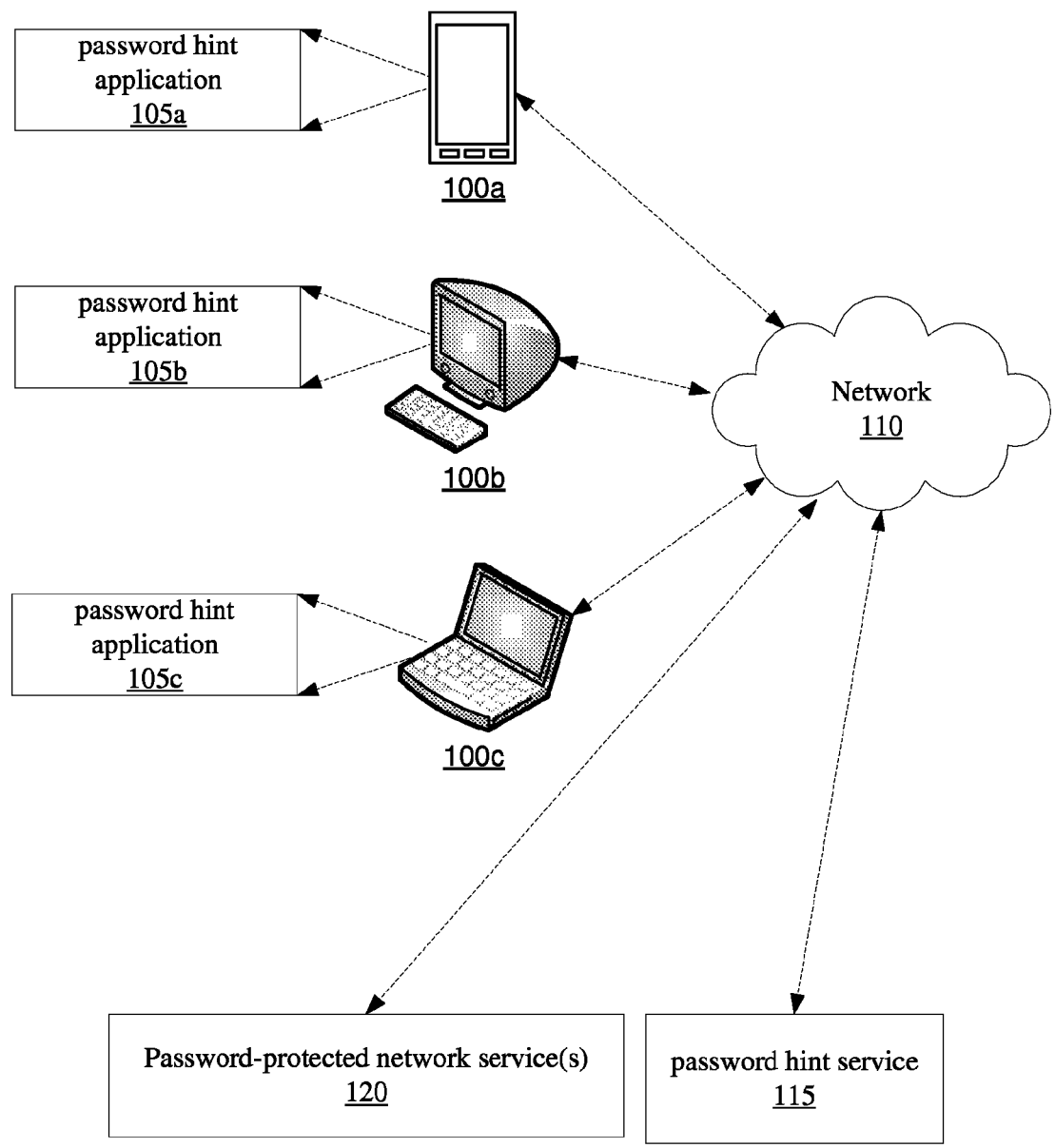
FIG. 1 is a block diagram illustrating a high-level view of an environment for implementing a password hint system, according to some embodiments.

Many systems, such as Internet applications, require password-based authentication. It is often desirable that users not create weak (low-entropy) passwords because such passwords are easy to break using brute-force attacks or simple guessing strategies. Accordingly, some authentication techniques attempt to prevent weak passwords by imposing various password requirements.

Unfortunately, strong (high-entropy) passwords are difficult to remember, which causes many security vulnerabilities. For example, users may record their strong passwords in vulnerable places where those passwords may be stolen. Some users may form passwords from common phrases or from previously used passwords, which may be easily guessed or already compromised. Some users may reuse their strong passwords across multiple systems such that an attacker who steals the user's password for one system may gain access to all other systems.

According to various embodiments, a password hint system can generate (or otherwise obtain) unique, high-entropy passwords on behalf of the user and provide the user with a storable password hint to aid the user in recalling the high-entropy password. In some embodiments, when the user requires a new password (e.g., for use with a web application), the user may invoke the password hint system and provide it with a spatial pattern. The system may then obtain (e.g., generate) a strong password and provide the user with a password hint based on the spatial pattern. The user may store the password hint and retrieve it when he needs the password. In some embodiments, the password hint system may store the hint on the user's behalf and retrieve the hint for the user when requested.

In some embodiments, when the password hint system is invoked, it may prompt the user for a spatial pattern by displaying a two-dimensional grid of cells. All of the cells may be empty or some or all may contain one or more characters. In the case where at least some of the cells contain one or more characters, then the grid may become a password hint. A two-dimensional grid with one or more characters in at least some of the cells may be referred to herein as an "abagram". After the grid of cells is displayed to the user, the user may supply a spatial pattern by selecting a sequence of cells from the grid. In embodiments where at least some of the cells contain one or more characters, the characters in the cells, if any, corresponding to the spatial pattern become the user's password (assuming the spatial patterns meets certain requirements). In other embodiments, after the user supplies the spatial pattern, the system may generate a strong password (considering the password requirements and properties of the spatial pattern such as length of the spatial pattern, intersections etc.) and obtain a password hint (e.g., generate an abagram by placing characters in the empty cells of the grid such that the characters of the generated password appear according to the user-supplied spatial pattern and other characters are placed in at least some of the cells that are not part of the spatial pattern). The password hint (i.e., the grid with cells containing characters of the password and other cells containing other characters) can then be provided to the user. For example, if the user selected the top row of the grid, the characters of the password would be the characters that appear in the cells of the top row (some of which may be empty) and various characters would occupy the other cells (or some of the other cells).

The user may store the password hint (e.g., abagram) in various ways (e.g., printing it out, storing the abagram digitally on a computer or phone, storing the abagram with a service provided over a network, etc.). In some embodiments, the password hint system may store the abagram for the user. Since the password hint does not directly reveal the password without additional knowledge of the user selected spatial pattern, the password hint need not be as protected as would a password. When the user wishes to access the password, he may obtain the abagram from wherever it is stored and reconstruct the password by recalling the spatial pattern he originally supplied when the password hint was created.

FIG. 1 is a block diagram illustrating a high-level view of an environment for implementing a password hint system, according to some embodiments. The illustrated embodiment includes multiple client devices 100, such as mobile phone 100a, personal computer 100b, and laptop 100c. The three types of client computing devices are shown for illustration only and it should be understood that a user may access password hint functionality, as described herein, using various different devices without limitation.

As illustrated in FIG. 1, any client device 100 may be configured to execute a password hint system as a local application 105. For example, mobile device 100a may be configured to execute a local password hint application 105a to perform various functions described herein (e.g., create passwords, create password hints, store password hints, retrieve password hints, etc.). For instance, a user of personal computer 100b may invoke password hint application 105b to create a new password for a new user account on a password-protected local software application. In response, password hint application 105b may prompt the user for a spatial pattern using a 2-dimensional grid, obtain a password, create an abagram based on the spatial pattern and the obtained password, and store the abagram for the user in association with the password-protected local software application. When the user later wishes to log into the local software application, he may instruct the password hint application 105b to display the abagram and use the displayed abagram and the spatial pattern to recall the password. Although password hint applications 105a-105c are referred to collectively herein as password hint application 105, it should be understood that each application may be optimized or otherwise varied to function on its respective host device 100.

In various embodiments, client devices may be connected to password-protected network services (e.g., 120) over one or more networks (e.g., 110). Network 110 may represent any combination of one or more networks, such as wireless or wired local area networks, wide area networks (e.g., Internet), and/or other networks. Password-protected network service(s) 120 may correspond to any number or type of network accessible services or services that provide network access. For example, services 120 may correspond to password-protected websites, such as ecommerce sites, social networking sites, email applications, cloud computing services, and/or other types of network services. Access to the Internet (e.g., from a public location) or to a corporate Intranet are other examples of network services. Any number of services 120 may implement websites, web applications, web services, database access services, data communication or processing services, and/or any other network accessible service that requires password-based authentication. As used herein, the term "network service" refers to any service that is provided over a network or provides network access, such as described in relation to network services 120.

In some embodiments, a password hint system (e.g., password hint application 105) may be used to create and/or manage passwords for password-protected network services (e.g., 120). For example, password hint application 105 may be configured to detect that the user is creating an account on a given password-protected network service 120 (e.g., password hint application 105 may be configured to detect that a web browser has received a web document (e.g., HTML document) requesting the user to create a new password for the network service) and, in response, retrieve password requirements from that network service, generate a password that meets those requirements, prompt the user to select a spatial pattern, and generate an abagram (or other password hint) such that the characters of the password are located in the abagram in accordance with the user's selected spatial pattern. The user can then complete creating the user's account by providing the generated password to the network service. In some embodiments, password hint application 105 may be configured to store the password hint in association with the network service for which it was created. Accordingly, a user may be able to browse stored password hints by network service. In some embodiments, password hint application 105 may be able to automatically detect an authentication prompt of the network service (e.g., detect that the user's browser is displaying a login screen of a website that includes a text input box in which the user is requested to input a password) and automatically retrieve and/or display a password hint that was stored in association with the network service. Such functionality is described in more detail below.

In some embodiments, the password hint system may include a password hint service 115 in addition to or instead of password hint application 105. For example, in some embodiments, password hint service 115 may implement all the functionality described above with regard to password hint applications 105 (e.g., a user may invoke service 115 to generate a password hint, to store the password hint, and/or to later retrieve the password hint). In such embodiments, the password hint service 115 may be accessible using generic means (e.g., web browser) such that clients 100 do not need to execute local password hint applications 105 at all.

In some embodiments, various functions of the password hint system may be split between password hint application 105 and password hint service 115. For example, password hint application 105 may be configured to generate passwords and password hints, but to store and later retrieve the password hints using password hint service 115. Thus, a user who created a password and hint using one client device (e.g., personal computer 100*b*) may later retrieve the hint using another client device (e.g., mobile device 100*a*). For example, application 105*b* may create a password hint for a user on computer 100*b* and store the hint at password hint service 115. Later, the same user may access the password hint stored on service 115 by using password hint application 105*a* on mobile device 100*a* or application 105*c* on laptop 100*c*.

In various embodiments, access to password hint storage functions (as described above with respect to password hint applications 105 and password hint service 115), may itself require authentication, such as password-based authentication, biometric authentication, or any combination thereof. In some embodiments, authentication may be based on identifiers associated with client devices 100 and/or components thereof. For example, in embodiments where password hints are stored at password hint service 115, service 115 may authenticate a user of mobile device 100*a* based on a subscriber identity module (i.e., SIM card) being used by mobile device 100*a*.

Figures 2A, 2B:
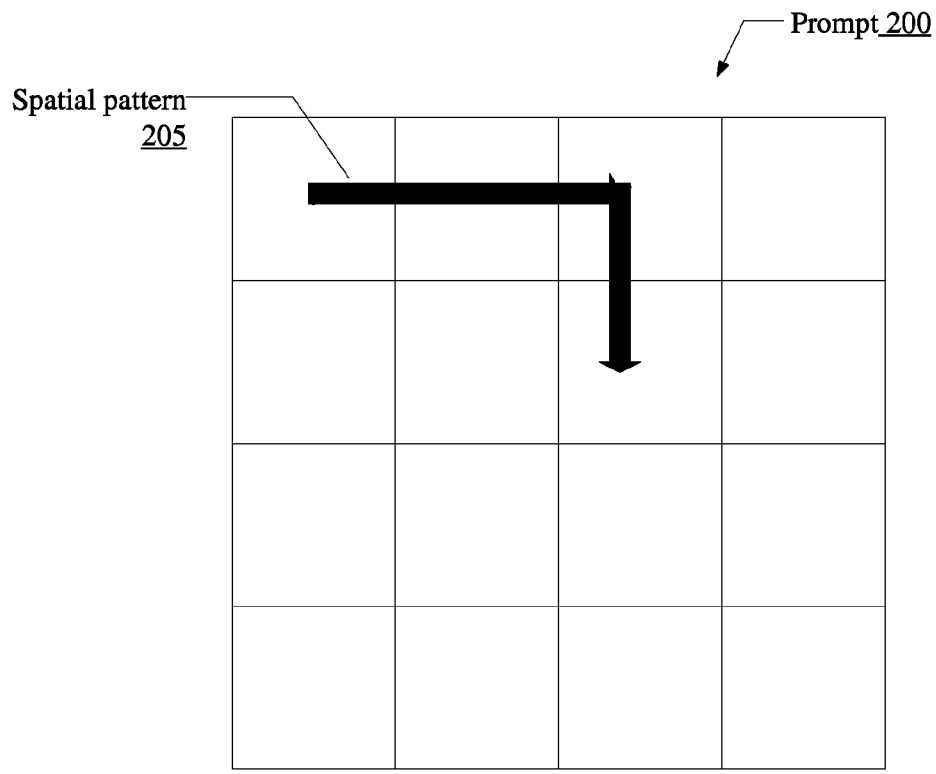
FIG. 2a illustrates an example of a prompt for a spatial pattern, according to some embodiments.
FIG. 2b illustrates an example of a password hint, according to some embodiments.

FIG. 2*a* illustrates an example of a prompt 200 for a spatial pattern, according to some embodiments. In various embodiments, prompt 200 may be created and/or displayed by a password hint system, such as password hint application 105 or password hint service 115. The password hint system may create and/or display prompt 200 in response to a user input or automatically in response to detecting that the user is attempting to create new authentication credentials.

According to the illustrated embodiment, prompt 200 is a 2-dimensional (4×4) grid of cells, where each cell is empty. In other embodiments, some cells of prompt 200 may contain one or more characters, as shown in FIG. 2B. Thus, in some embodiments, prompt 200 may be an abagram. Additionally, in other embodiments, the prompt may be a grid with different dimensions, such as an n×m grid, where n and m are different. In some embodiments opposite sides of the grid may be possible to identify such that the spatial pattern may wrap around, e.g., go out on one side and continue on the opposite side. In other embodiments the prompt may consist of multiple grids. In some embodiments, the prompt may be an arbitrarily shaped, non-rectangular, grid. In yet other embodiments, the prompt may not be a grid at all. For example, the prompt may be any graphic (e.g., photo) that permits the user to specify and recall a spatial pattern, such as by selecting a sequence of regions in the graphic or the prompt may be a 3-dimensional structure such as a cube or other 3-dimensional structure. In some embodiments, the prompt may comprise a sequence of sub-prompts, where each sub-prompt maybe formed according to one of the aforementioned embodiments. Each sub-prompt may then be associated with part of a password.

In the illustrated embodiment, a user presented with prompt 200 may select a spatial pattern (e.g., spatial pattern 205), which comprises an ordered set of four cells of the 2-dimensional grid. As used herein, the term "spatial pattern" refers to any ordered sequence of locations in a space with any number of dimensions. For example, a spatial pattern may be a sequence of one or more lines in any number of dimensions. Spatial pattern 205 for example, comprises two straight lines through 2-dimensional space, where the two lines define an ordered sequence of four cells in prompt 200.

The user may select a spatial pattern, such as pattern 205, using whatever means are appropriate for the client device with which the user is accessing the password hint system. For example, a user using a mobile device (e.g., 100*a*) may swipe his finger across the sequence of cells that define spatial pattern 205 or press a sequence of keys that correspond to spatial pattern 205. On a desktop computer (e.g., 100*b*), the user may utilize a keyboard, mouse, joystick, or other pointing device to select the pattern. In various embodiments, the spatial pattern need not be continuous and may correspond to any sequence of cells/regions of the prompt. In some cases, a user may repeatedly select cells/regions within the same pattern.

In some embodiments, the selected spatial pattern may be displayed on the prompt as the pattern is being selected. For example, in FIG. 2*a*, as it is being defined, spatial pattern 205 is displayed on prompt 200, as shown in FIG. 2*a*. It is to be understood that spatial pattern 205 is not initially displayed as part of prompt 200 before being defined by the user.

In embodiments where prompt 200 is of the form shown in FIG. 2*a* (i.e., cells are empty), after a user is prompted for a spatial pattern (e.g., using prompt 200) and after the user provides the spatial pattern (e.g., spatial pattern 205), the system may generate a password hint using the spatial pattern and a set of characters (e.g., letters, numbers, etc.). For example, the password hint may include an arrangement of characters superimposed on the prompt, such that the characters of the password are superimposed according to the user-defined pattern. In other embodiments, the hint may include only the arrangement of characters without any or all of the original prompt. In embodiments where prompt 200 is an abagram, after the user provides the spatial pattern (e.g., spatial pattern 205), the system may determine whether the spatial pattern meets certain predefined requirements. If not, user must input a new spatial pattern, otherwise the system will obtain as the user's password the characters of the abagram that correspond to the spatial pattern selected by the user.

FIG. 2*b* illustrates an example of a password hint 250, according to some embodiments. In the example shown, password hint 250 is an abagram that may correspond to a password hint created in response to a user selecting spatial pattern 205 using prompt 200 of FIG. 2*a*.

According to the illustrated embodiment of FIG. 2*b*, password hint 250 comprises an arrangement of characters overlaid on prompt 200, such that certain cells in the grid contains one, two, or three characters. In other circumstances, the system may include any number of characters in each cell, certain cells may even have no characters at all, which is a decision that may depend on the password requirements of the target authentication system and/or on the number of cells specified by the user-selected spatial pattern. For example, if the target authentication system requires that a password have at least eight characters, but the user has selected a spatial pattern that covers only three cells, the hint generator may include at least three characters in each cell. As a second example, if the user has selected a self-intersecting spatial pattern, the cell of the grid where the pattern intersects itself may be empty.

As used herein, the term "target authentication system" refers to any authentication system, which may be used by a service or network service. The authentication system may be part of the network service, a subcomponent, or a third-party authentication system separate from the service for which it provides authentication. A given authentication system may also provide authentication functionality for a plurality of different services or network services.

The characters of password hint 250 are arranged such that the characters in the password appear according to the selected spatial pattern. For example, if the user selected spatial pattern 205 of FIG. 2a, then the password indicated by password hint 250 is "i8pBnj4u". When the user sees password hint 250, he may recall the spatial pattern he selected and use that recollection in conjunction with password hint 250 to determine his password.

Figure 3:
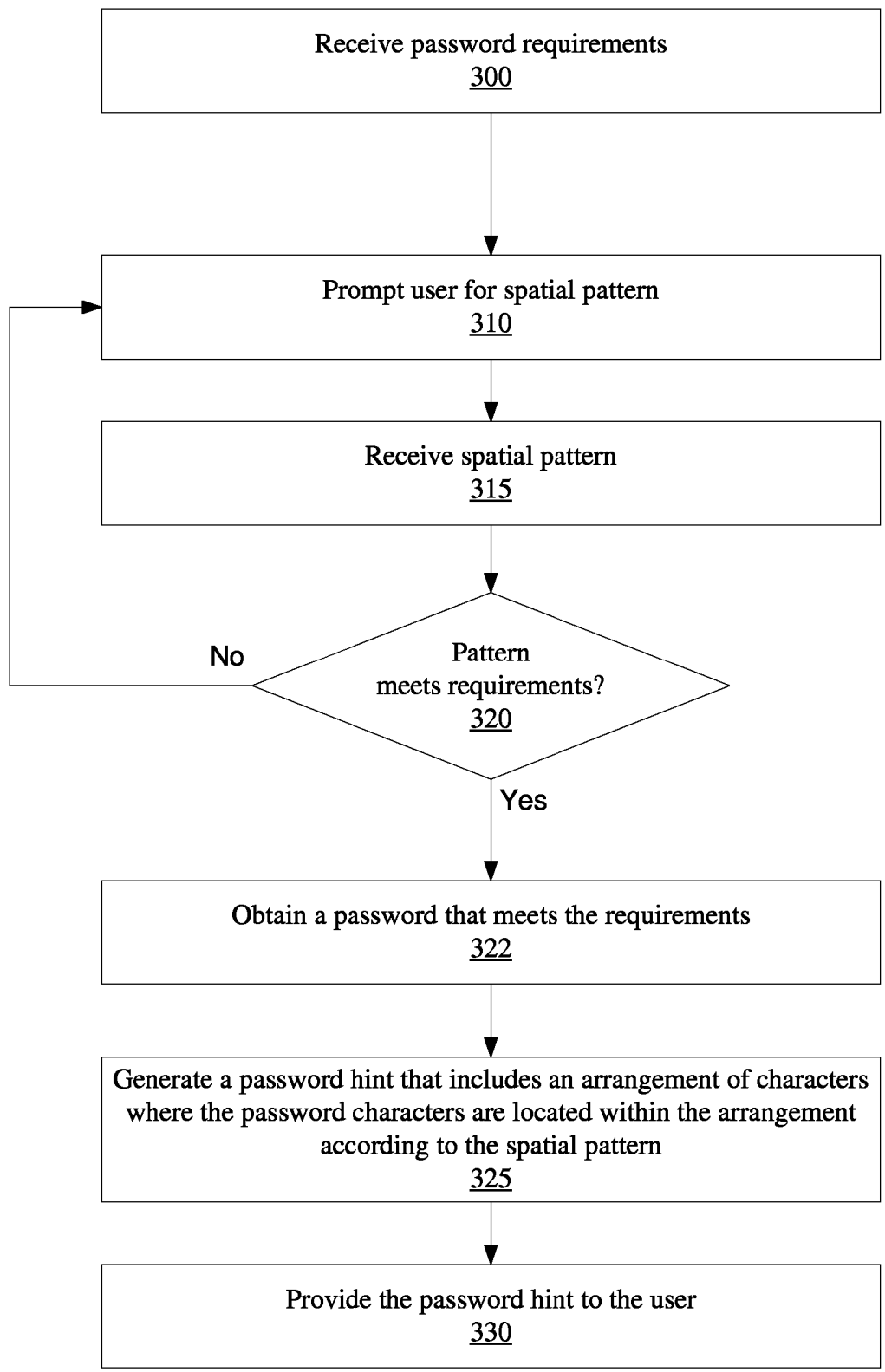
FIG. 3 is a flow diagram illustrating a general method for operation of a password hint system, according to some embodiments.

FIG. 3 is a flow diagram illustrating a general method for operation of a password hint system, according to some embodiments, for generating a password hint for assisting a user in recalling a password for a target service. The method of FIG. 3 may be implemented by a password hint application (e.g., 105 of FIG. 1), a password hint service (e.g., 115 of FIG. 1), or any combination thereof, as described above. The method may be initiated in various ways, such as by a user request and/or by an automatic detection that the user is attempting to create authentication credentials or has been prompted to create authentication credentials for the target service.

According to the illustrated embodiment, the password hint system may receive password requirements, as in step 300. Password requirements may correspond to those dictated by the authentication system of the target service (i.e., the target authentication system). For example, password-protected websites (e.g., ones of network services 120) often require that a user's password conform to requirements such as a minimum length, including at least certain types of characters, including a minimum diversity of characters, not including certain words (e.g., dictionary words, user's name, and/or obvious variations thereof), not including repeated characters, and/or other types of requirements.

The password requirements gathering step of 300 may be performed in different ways. For example, in some embodiments, the password hint system may prompt the user to identify the particular password requirements. In other embodiments, the system may be configured to request the password requirements via some interface. For example, if the target service (and/or target authentication system) is implemented as a network service, the network service may expose a programmatic interface (API) or comply with a communication protocol by which the password hint system may request and obtain the password requirements from the network service (and/or from the target authentication system) in some machine-readable format.

In step 310, the password hint system prompts the user for a spatial pattern. For example, the system may prompt the user by displaying a 2-dimensional grid, such as prompt 200 in FIG. 2a. As discussed above, the prompt may include any graphic that assists the user in defining and selecting a spatial pattern.

In step 315, the system receives the spatial pattern from the user. As described above, the user may utilize any selection means appropriate for the computing device he is using. For example, the user may swipe the pattern with his finger on a touch screen, strike keys on a keyboard or keypad, use a pointing device such as a mouse or joystick, and/or utilize any other appropriate means for specifying the pattern.

In step 320, the password hint system determines whether the received pattern meets one or more pattern requirements (e.g., is sufficiently complex, is not too complex, etc.). The decision of 320 may depend on various factors, such as the password requirements received in 300 and/or the prompt provided to the user in 310. For example, the password hint system may be configured to require that the spatial pattern include a minimum number of distinguishable regions of the prompt (e.g., a minimum number of cells selected from a grid) and/or a minimum number of contiguous regions, such that the pattern is difficult to guess. Decision 320 may also or otherwise depend on the password requirements of the target authentication system. For example, consider an embodiment where the password hint system is able to create hints with a maximum of four characters overlaid on each region of the prompt. If the target authentication system requires a password with at least 10 characters and the user has selected a spatial pattern that includes only two regions of the prompt, the password hint system may not be able to generate an adequate hint. In such a case, the password hint system may prompt the user to select a longer/more complex spatial pattern that includes at least three regions of the prompt.

In some embodiments, the system may determine in step 320 if the spatial pattern is too complex. For example, in some systems, a user may be forbidden from selecting a spatial pattern that intersects itself. In such a system, decision 320 may resolve in the negative if the user selects a self-intersecting pattern. The system may check various other requirements in step 320. For example, if the hint system determines that a given pattern limits the entropy of a password that could be generated using the pattern, the hint system may reject such a pattern in decision 320.

If the password hint system determines that the selected pattern does not meet the pattern requirements, as indicated by the negative exit from 320, the method returns to 310 and the password hint system prompts the user again for a new spatial pattern.

If the password hint system determines that the pattern meets the requirements as indicated by the affirmative exit from 320, then, in some embodiments (e.g., embodiments where prompt 200 is of the form shown in FIG. 2A), password hint system obtains (e.g., generates, selects, receives, retrieves) a password that meets the requirements received in step 300, as in step 322. For example, in some embodiments, the password hint system may obtain a password by generating a password that meets the requirements, using a random or pseudo-random number generator. Various methods for generating the password are described in more detail below. If the password hint system determines that the pattern meets the requirements as indicated by the affirmative exit from 320, then, in other embodiments (e.g., embodiments where prompt 200 is an abagram), the password hint system obtains the password by determining the characters of the cells of the abagram that correspond to the spatial pattern.

In some embodiments, the password hint system may receive the password from a different component, from a third party or from the user himself. For example, the target authentication system itself may expose a programmatic interface for obtaining a new password that meets the authentication system's minimum complexity requirements. In such embodiments, the password hint system may obtain a valid password from the target authentication system in step 322 without the need to obtain password requirements (as in step 300) and perform password generation. In other embodiments, in obtaining a password that meets certain requirements, the password hint system may select a password from a previously generated set of passwords where every password in the set meets the requirements. In other embodiments where the password is already known to the user, in obtaining the password, the password hint system prompt the user to input the password.

In some embodiments, the password obtained in step 322 may depend on the spatial pattern received in step 315. For example, in some embodiments, the obtained password may contain a number of characters that is dependent on the spatial pattern (e.g., one character for each cell of a grid prompt). In another example, if the spatial pattern is a path that crosses itself, then a password with repeating characters may be generated. In general, across various embodiments, there may be any relationship between the spatial pattern and the generated password length. If there is no relationship, the password may be generated before or after the spatial pattern is received.

In step 325, the password hint system obtains (e.g., generates, selects) a password hint that includes an arrangement of characters where the password characters are located within the arrangement according to the spatial pattern. For example, the password hint may be an abagram, such as password hint 250 of FIG. 2b.

In some embodiments, the hint system may generate a password hint such that it would be difficult to guess the password given the hint. In doing so, the hint system may consider the password policy of the target authentication system. For example, if an authentication system requires that every password include at least one digit, then the hint system may attempt to generate a hint that includes at least one digit in several locations such that many patterns would include at least one digit.

In some embodiments, step 325 may be performed before step 322. For example, in some embodiments, the password hint system may maintain a set of pre-existing abagrams and, in performing step 325, the password hint system merely selects one of the pre-existing abagrams. In such an embodiment, the password hint system may perform step 322 (i.e., obtaining a password) by merely selecting a sequence of characters from the selected pre-existing abagram in accordance with the spatial pattern selected by the user. In other embodiments, the password hint system may iteratively and possibly adaptively generate random password hints according to some probability distribution of the character sets until the hint and pattern induced string of characters satisfy the password requirements.

In step 330, the password hint system stores the password hint and/or provides the password hint to the user. In some embodiments, providing the password hint may include displaying the password hint, providing a password hint file, printing the password hint, and/or performing any other functions that enable the user to access the password hint immediately and/or at a later time, e.g. storing or requesting input values used in an algorithm from which the password hint can be reconstructed. In some embodiments, storing for the user, or providing to the user, the password hint may consist merely of storing or providing hint information from which the arrangement of characters can be generated. For example, in embodiments where the password hint is created by generating the characters that comprise the password hint using a pseudo-random number generator and a set of one or more seed values (hint information), the step of storing or providing the password hint may comprise (or merely consist of) storing or providing the hint information (set of one or more seeds).

In some embodiments, the method may also comprise providing the user with access to the password obtained in step 322. In cases where the user wishes to use the password immediately after creating it, providing the password to the user may confer a measure of convenience. For example, in some embodiments, the password may be displayed to the user who may then copy it into a password authentication field of the target network service. In addition to and/or instead of displaying the text of the password, the password hint system may provide the new password by placing it into a copy/paste buffer of the user's system, writing the password directly into the appropriate authentication field of the password protected service, automatically authenticating to the target service using the password, and/or providing the password to the user more directly.

As described above, in some embodiments, the password hint system may obtain passwords and/or password hints in different orders than are indicated in FIG. 3. For example, in some embodiments, the password hint system may first generate the password hint and then use it to prompt the user to select pattern. To illustrate this concept further, consider a hint system that generates abagram hints satisfying password requirements of the kind which mandates characters from certain character sets. Such a hint system may operate as follows: (1) generate M random characters from character set C1, where M is at least the length of the column of an abagram rectangle (apply the same procedure for other policy-required character sets); (2) embed the characters belonging to a particular set as a column, or other contiguous pattern from top to bottom; (3) add a pattern requirement that the pattern must contain a contiguous component between left and right side; (4) select the other (non-pattern overlaid) entries in the abagram at random, uniformly from the union of the character sets, or weighted according to policies. If the additional pattern requirement is complied with then so are the password requirements.

Figure 4:
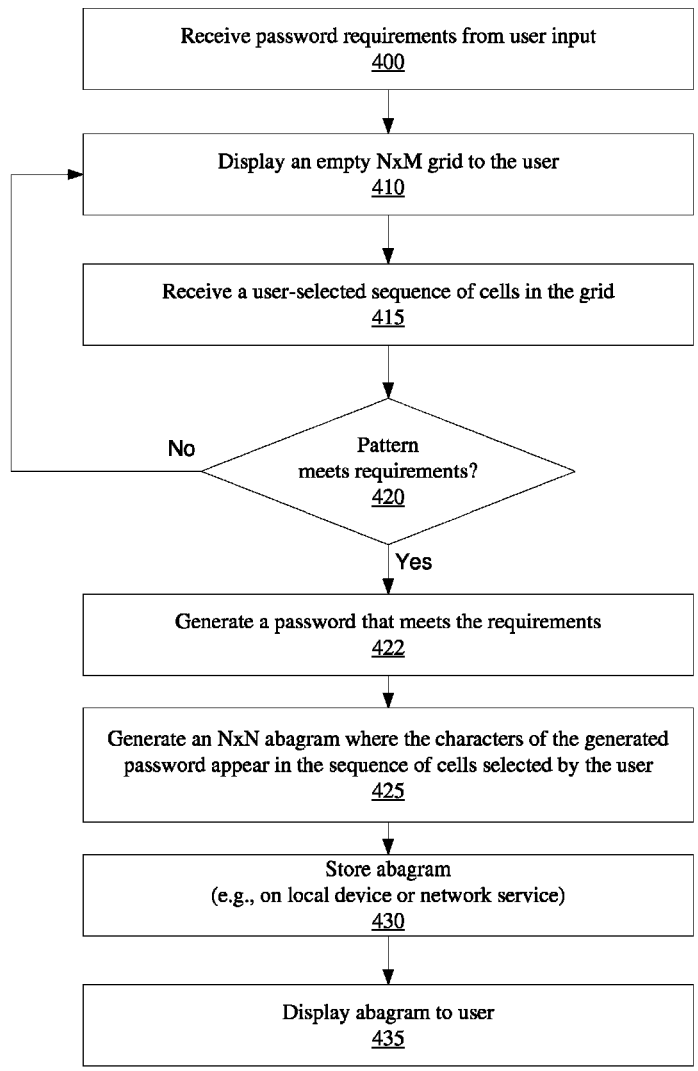
FIG. 4 is a flow diagram illustrating a method for operation of a password hint system, according to some embodiments.

FIG. 4 is a flow diagram illustrating a method for operation of a password hint system, according to some embodiments. The method of FIG. 4 may correspond to a more specific implementation of the method of FIG. 3 and may be performed by the same systems and in response to the same conditions.

The method of FIG. 4 begins in step 400 when the password hint system receives password requirements from user input. For example, the user may input the password requirements into the system using a graphical user interface. Thus, step 400 may correspond to step 300 of FIG. 3.

In step 410, the password hint system prompts the user for a spatial pattern by displaying an empty N×M grid (in some embodiments, N may equal M). The grid may appear similar to prompt 200 in FIG. 2a. Thus, step 410 may correspond to step 310 of FIG. 3.

In step 415, the password hint system receives a sequence of cells selected by the user. For example, the system may receive spatial pattern 205 of FIG. 2a. Thus, step 415 may correspond to step 315 of FIG. 3.

In step 420, as in step 320, the password hint system determines whether the spatial pattern meets a pattern requirement (e.g., is sufficiently complex). If not (as indicated by the affirmative exit from 420) the password hint system prompts the user for another pattern (as indicated by the feedback loop to 410). Otherwise, if the sequence is satisfactory (as indicated by the affirmative exit from 420), the system generates a password, as in step 422.

In step 422, the password hint system generates a password that meets the requirements input in step 400. The password hint system may generate the password in step 422 using various known methods for generating high-entropy passwords, such as by applying pseudo-random number generation and/or other statistical methods. Thus, step 422 may correspond to step 322 in FIG. 3. In some embodiments, the password generated in step 422 may depend on the spatial pattern received in step 415. For example, if the spatial pattern received in step 415 is of lengh (l) cells, then the password generated in step 422 may also have a length of (l) characters.

In step 425, the password hint system obtains an N×M abagram where the characters of the generated password appear in the sequence of cells selected by the user (i.e., according to the spatial pattern). Thus, the N×M abagram serves as the password hint. Accordingly, step 425 may correspond to step 325 of FIG. 3.

In step 430, the password hint system stores the abagram as a password hint. In various embodiments, the system may store the abagram locally (e.g., as a file, in a DB, etc.) or in a remote server accessible over a network (e.g., password hint service 115 of FIG. 1).

In step 435, the password hint system displays the abagram to the user. In various embodiments, the password hint system may display the abagram to the user before, after, or concurrently to storing the abagram. In addition or instead of showing the abagram in step 435, the password hint system may provide the user with direct access to the password generated in step 422 or otherwise facilitate authentication to the target system.

Figure 5A:
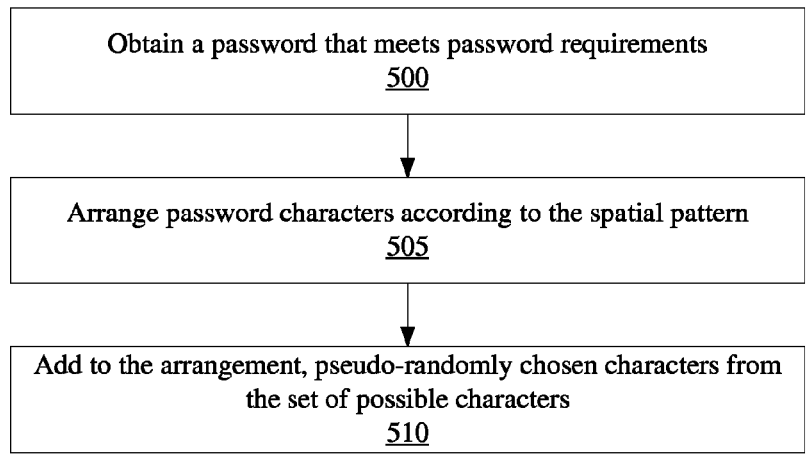
FIG. 5A is a flow diagram illustrating a method for generating a password hint according to some embodiments.

FIG. 5A is a flow diagram illustrating a method for generating a password hint according to some embodiments. The method of FIG. 5 may correspond to steps 322 and 325 of FIG. 3 or to steps 422 and 425 of FIG. 4.

In step 500, the password hint system obtains a password that meets whatever minimum password requirements the target authentication system may impose. Obtaining a password may involve generating, retrieving, and/or otherwise obtaining a password from a third party, as described with relation to step 322 of FIG. 3 or step 422 of FIG. 4. For example, to generate a password, the system may pseudo-randomly choose characters from one or more sets of required characters until the password contains all required characters, pseudo-randomly choosing additional characters until the password is of the desired length, and pseudo-randomly permuting the chosen characters.

In step 505, the password hint system arranges the characters of the password according to the received spatial pattern. For example, if the password prompt is the grid of FIG. 2a, and the generated password is "i8pBnj4u," the password hint system may embed the password in the grid (i.e., place the characters "i8" in the first cell indicated by the pattern, "pB" in the second cell indicated by the pattern, and so forth, until the four cells indicated by the spatial pattern collectively contain the password "i8pBnj4u", as shown in password hint 250). In some embodiments, the password hint system need not embed the characters directly into the prompt (e.g., grid), but may simply arrange them according to the spatial pattern.

In step 510, the password hint systems fills out the remainder of the character arrangement by inserting various characters from the set of possible characters. The password hint system may be configured to determine the set of possible character via the same or similar mechanism as for obtaining password requirements. In various embodiments, the characters that fill out the hint arrangement may be selected in a uniform or weighted manner from the set of all valid characters. As an example of a non-uniform selection, the remainder of the characters could be chosen so as to make a large number of spatial arrangements of the grid contain characters that comply with the password requirements. For example, if the password requirement is that each password must contain at least one digit (from the set "0", "1", ..., "9") then one may ensure that each row and column contains at least one such digit. This makes it harder for a $3^{rd}$ party, having gained access to the password hint, to extract the password.

Various other algorithms for creating the character arrangement hint are possible. For example, the system may first receive the user's spatial pattern, then generate an arrangement of characters chosen pseudo-randomly and/or by weighted distribution from the set of legal characters, and finally check to see whether the arrangement and pattern define a legal password. If so, then the hint is provided to the user. Otherwise, the password hint system may repeat the process, optionally adapting the arrangement generation algorithm, e.g. by changing the weighted distribution of characters in response to what password requirements were not complied with, until it produces a password hint that defines a legal password (given the user's spatial pattern). Accordingly, step 322 may be performed after step 320 and step 422 may be performed after step 420.

Figure 5B:
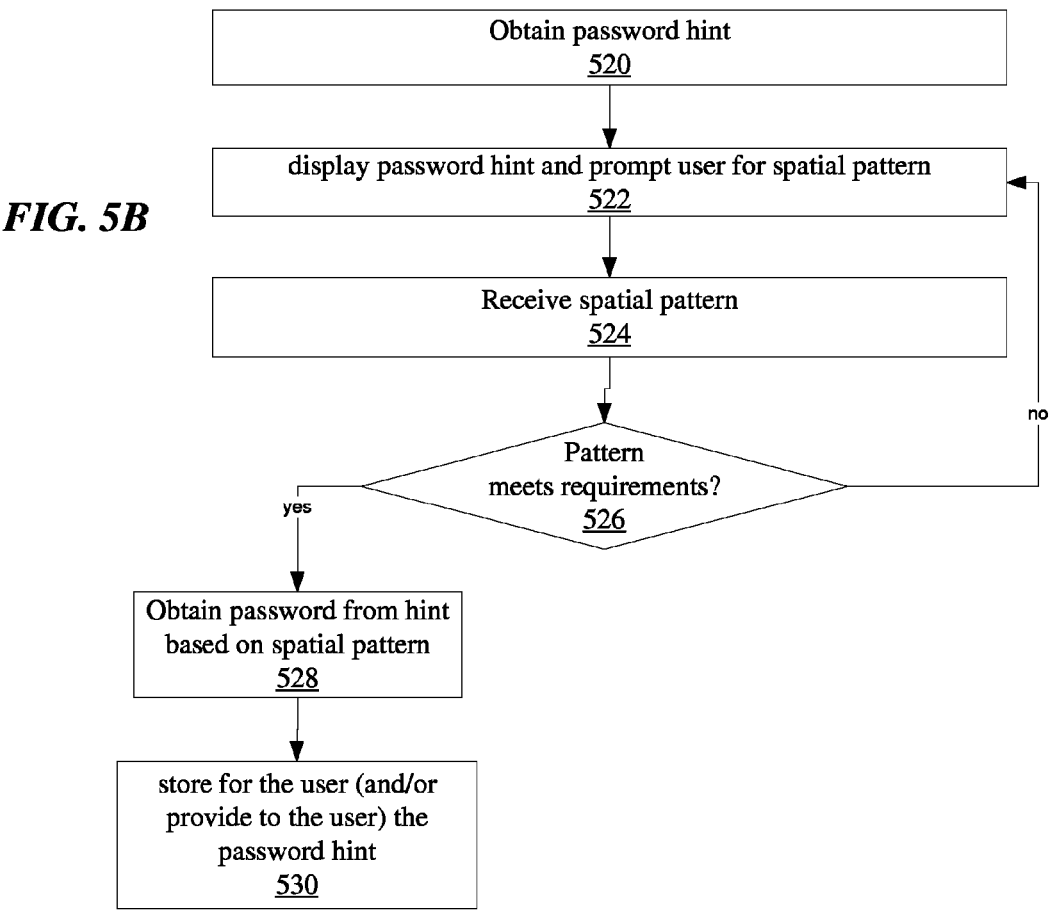
FIG. 5B is a flow diagram illustrating a method for obtaining a password.

FIG. 5B is a flow chart illustrating a process for obtaining a password after obtaining a password hint. The process may begin in step 520, the password hint system obtains a password hint (e.g., generates a password hint or selects a password hint from a predefined set of password hints). In step 522, the password hint system displays the password hint, thereby prompting the user for a spatial pattern. In step 524, the password system receives a spatial pattern input by the user. In step 526, the password hint system determines whether the spatial pattern meets certain requirements. If not, the process returns to step 522 so that the user can input a new spatial pattern, otherwise the process proceeds to step 528. In step 528, the password hint system obtains a password from the password hint based on the spatial pattern input by the user. For example, the password hint system determines the characters of the password hint that correspond to the spatial pattern. In step 530, the password hint system stores for the user (and/or provides to the user) the password hint.

Figure 6A:
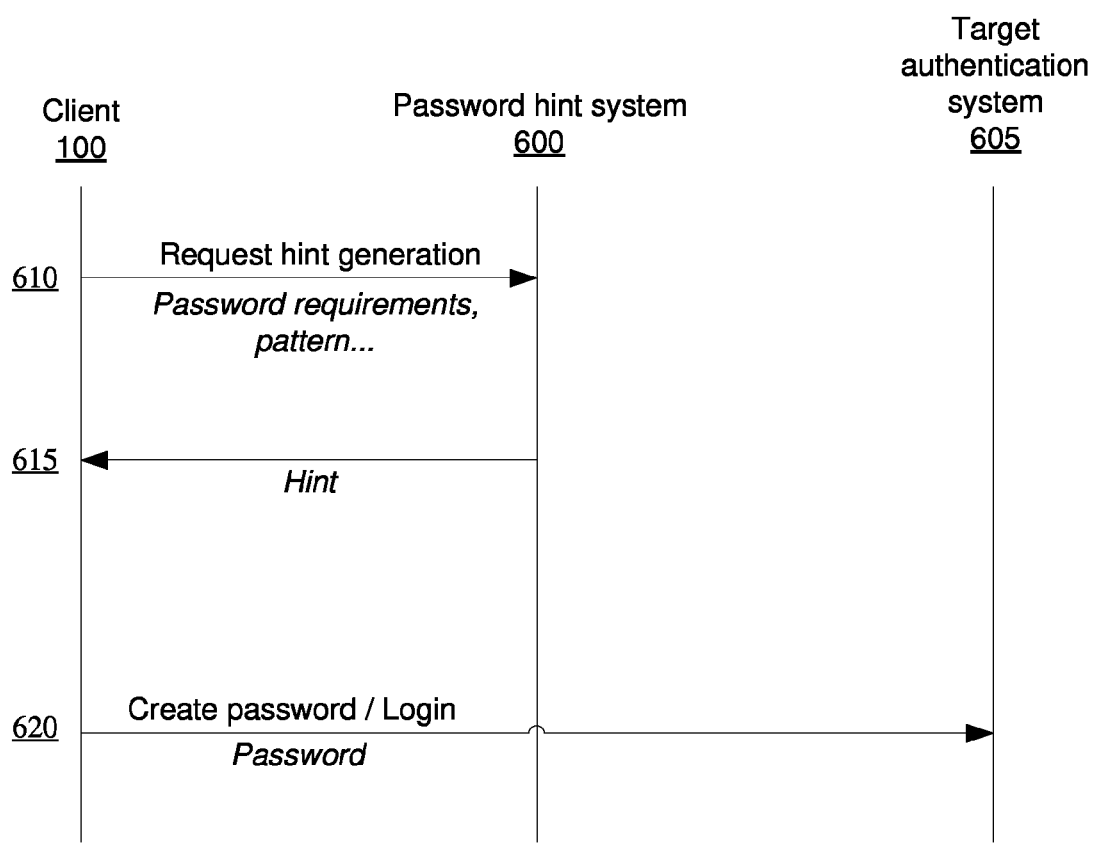
FIG. 6a is a timeline diagram illustrating interactions between a client (i.e., user), a password hint system, and a target authentication system, according to some embodiments.

FIG. 6a is a timeline diagram illustrating interactions between a client, a password hint system, and a target authentication system, according to some embodiments. Client 100 may correspond to any of client systems 100 of FIG. 1, which may be operated by a user. Password hint system 600 may correspond to a password hint application 105, password hint service 115, or any combination thereof. Target authentication system 605 may correspond to any password-based authentication system whether it is executed on the same computer as client 100 and/or password hint system 600, on a different computer on the same network, or on a remote computer on the Internet or other wide area network. For example, authentication system 605 may correspond to a username/password login of a web application, such as a web email application. Time is represented in the vertical direction with later events appearing below earlier events. Request descriptions appear above the request and request parameters appear below.

According to the illustrated embodiment, client 100 sends request 610 for password hint generation to password hint system 600. Request 610 includes a description of the password policy (i.e., requirements) of target authentication system 605. The client may obtain the password policy by user input, by querying a database or another system (e.g., target authentication system 605), or any other means.

Request 610 also includes a user-defined spatial pattern (e.g., spatial pattern 205). In some embodiments, client 100 may send the spatial pattern to password hint system 600 after first requesting and receiving a prompt (e.g., 2-dimensional grid) from password hint system 600. In various such embodiments, client 100 may submit the password policy to the password hint system in either request 610 or in a previous request (e.g., for a hint prompt).

In response 615, password hint system 600 responds to request 610 by returning a password hint to client 100. The password hint may be an abagram or any other arrangement of characters where the characters of a password for the target authentication system are located within the arrangement according to the spatial pattern received in 610. The hint itself may be in various forms, such as an image file, a markup description (e.g., HTML, XML), or any other format sufficient to represent the arrangement of characters.

In various embodiments, response 615 may include the password itself for the user's convenience. For example, if password hint system 600 is implemented on a remote system (e.g., 115), then the password hint system may return the hint along with a textual representation of the password for client 100 to display to the user and thereby save the user the time of deriving the password from the hint. If password hint system 600 is a local application on the same device as the client (e.g., applications 105), then returning the password hint may comprise displaying and/or saving the hint, displaying the password, and/or placing the password into a copy/paste buffer of client system 100.

In request 620, client 100 uses the password to create its login credentials and/or to authenticate to the target authentication system 605. In embodiments where password hint system 600 placed the password in a copy/paste buffer of client 100, the user may simply paste the password into a password field of target authentication system 605, and submit the password in request 620.

Figure 6B:
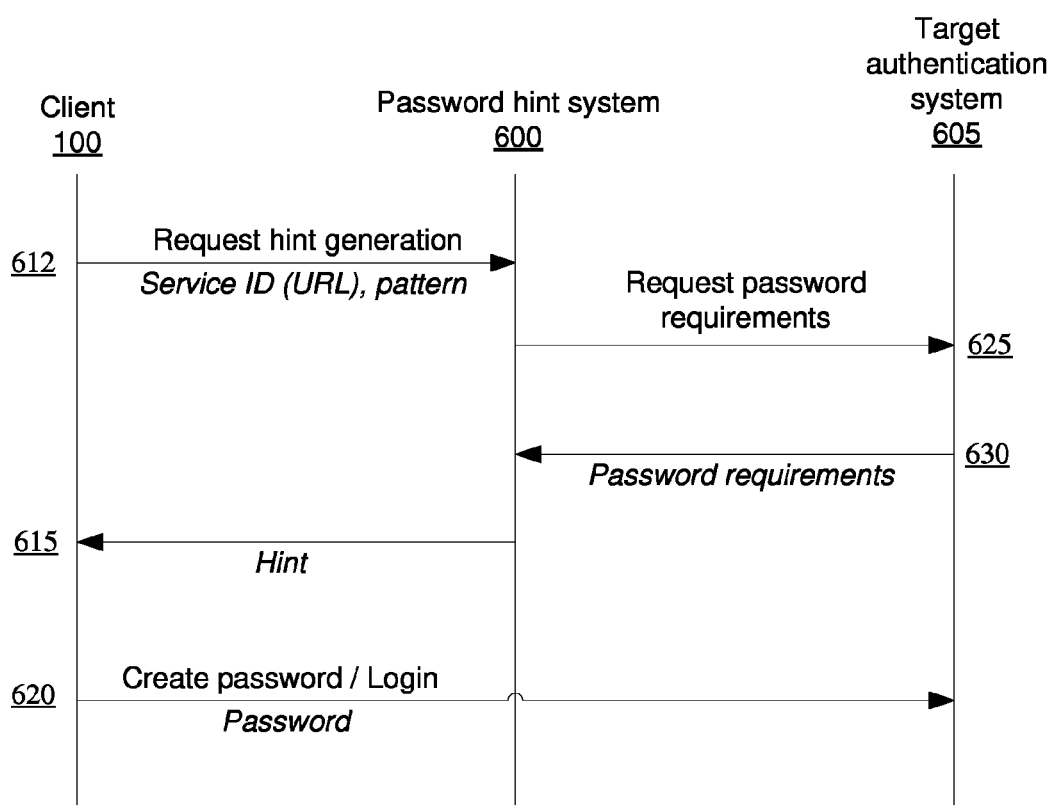
FIG. 6b is a timeline diagram illustrating interactions between a client (i.e., user), a password hint system, and a target authentication system, according to some embodiments.

FIG. 6b is a timeline diagram illustrating interactions between a client, a password hint system, and a target authentication system, according to some embodiments. FIG. 6b is a variation on the timeline of FIG. 6a. Analogous elements are numbered identically and the descriptions of those elements with relation to FIG. 6a may be applied.

In FIG. 6b, client 100 sends a request for hint generation 612. In contrast to request 610 in FIG. 6a, request 612 does not include the password requirements directly, but includes a service identifier (e.g., a URL) where password hint system 600 may obtain the password policies of the target authentication system 605. In some embodiments, the identifier may be a URL exposed by target authentication system 605 or by a related system.

In request 625, password hint system 600 requests the password policy from target authentication system 605. In response 630, target authentication system 605 returns an indication of the password policy. Using the password policy received in 630, the password hint system 600 may generate a new high-entropy password that meets the requirements. In some embodiments, rather than returning a password policy in 630, target authentication system 605 may return a new high-entropy password that is available. Such a system may reduce the complexity of password hint system 600.

As in FIG. 6a, password hint system 600 returns the hint (and potentially the password as well) to client 100 in response 615. In request 620, client 100 presents its password and/or other authentication credentials to target authentication system 605.

Figure 6C:
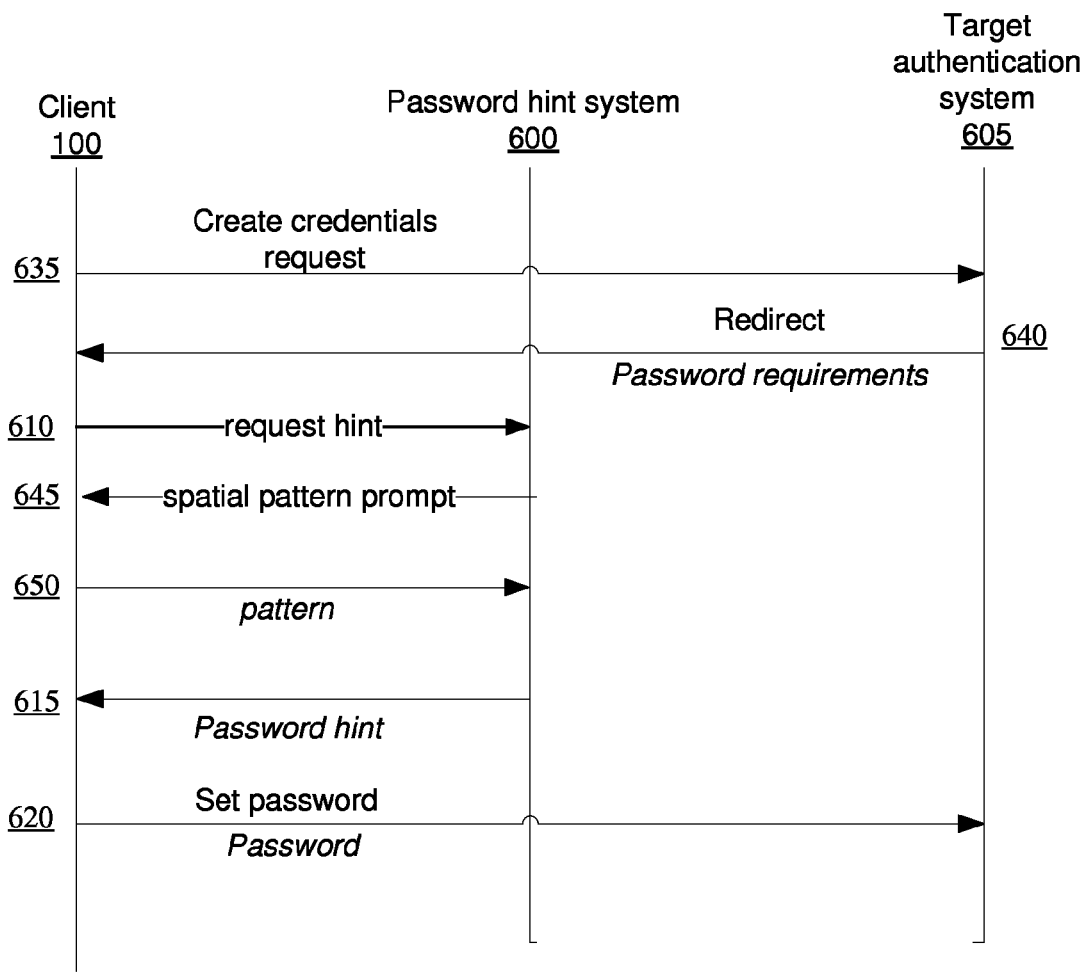
FIG. 6c is a timeline diagram illustrating interactions between a client (i.e., user), a password hint system, and a target authentication system, according to some embodiments.

FIG. 6c is a timeline diagram illustrating interactions between a client, a password hint system, and a target authentication system, according to some embodiments. FIG. 6c is a variation on the timelines of FIG. 6a and FIG. 6b. Analogous elements are numbered identically and the descriptions of those elements with relation to FIG. 6a and FIG. 6b may be applied.

In FIG. 6c, client 100 attempts create authentication credentials by sending request 635 to target authentication system 605. For example, client 100 may request a "create account" or a "reset password" web page from a web application protected by authentication system 605. In response, the target authentication system 605 or related system may send a login/credential-creation interface to client 100 for display to the user.

In response to detecting that client 100 is attempting to create a new password (as in request 635), target authentication system 605 may invoke password hint system 600. In various embodiments, authentication system 605 may invoke password hint system 600 in different ways. For example, in some embodiments, authentication system 605 may send a request directly to password hint system 600 (e.g., request 640) that instructs password hint system 600 to interact with client 100 to create a password and hint. Request 640 may include the password policies of target authentication system 605.

In other embodiments, authentication system 600 may send a redirect instruction to client 100, thereby instructing client 100 to set up a password with password hint system 600. The redirect instruction may include an indication of the password policies of authentication system 605. The redirect instruction may cause client 100 to show the user an interface to password hint system 600, such as in a popup window, new tab or window of a web browser, new frame of a webpage, or other interface mechanism. In some embodiments, the interface to the password hint system may be displayed such that some or all of the login/credential-creation interface of target authentication system 605 remains displayed.

In request 645, password hint system 600 requests a spatial pattern from client 100. The request may include a prompt, such as a 2-dimensional grid. In response to receiving request 645, client 100 may prompt its user for a spatial pattern and return the pattern to password hint system 600 in reply 650. In some embodiments, a user may configure client 100 to always use the same pattern. In such systems, client 100 may not need to prompt its user for a pattern each time it receives a request such as 645. Instead, the client may automatically send the previously stored, default pattern in reply 650.

In response to receiving the spatial pattern in 650, password hint system 600 sends a password hint (and optionally a password) in response 615. In request 620, the user of client 100 uses the hint and/or password to create his login credentials and/or log into authentication system 605.

In some embodiments, the password hint system 600 may use the password to automatically set the user's password at target authentication system 605 and/or to authenticate the user to target authentication system 605. Thus, rather than requiring client 100 to independently send message 620 and/or a subsequent authentication message, password hint system 600 may send such messages automatically on the user's behalf.

In some embodiments, password hint system 600 of FIG. 6c may be part of an identity provider service (IdP). The IdP may serve as an intermediary between users (e.g., client 100) and various authentication systems (e.g., system 605). In such a system, in addition to creating a password and password hint for client 100, the IdP may store the hint in association with the user and with target authentication system 605, and provide the hint to the user at a subsequent appropriate time. For example, when the user later engages target authentication system 605, (e.g., by arriving at a login screen), the target authentication system may provide the user with an option to retrieve his hint from the IdP (e.g., by clicking on a button). In response to the user request, the target authentication system may retrieve the password hint from the IdP or cause the client to retrieve the password hint (e.g., via a redirect or popup window).

Figure 7:
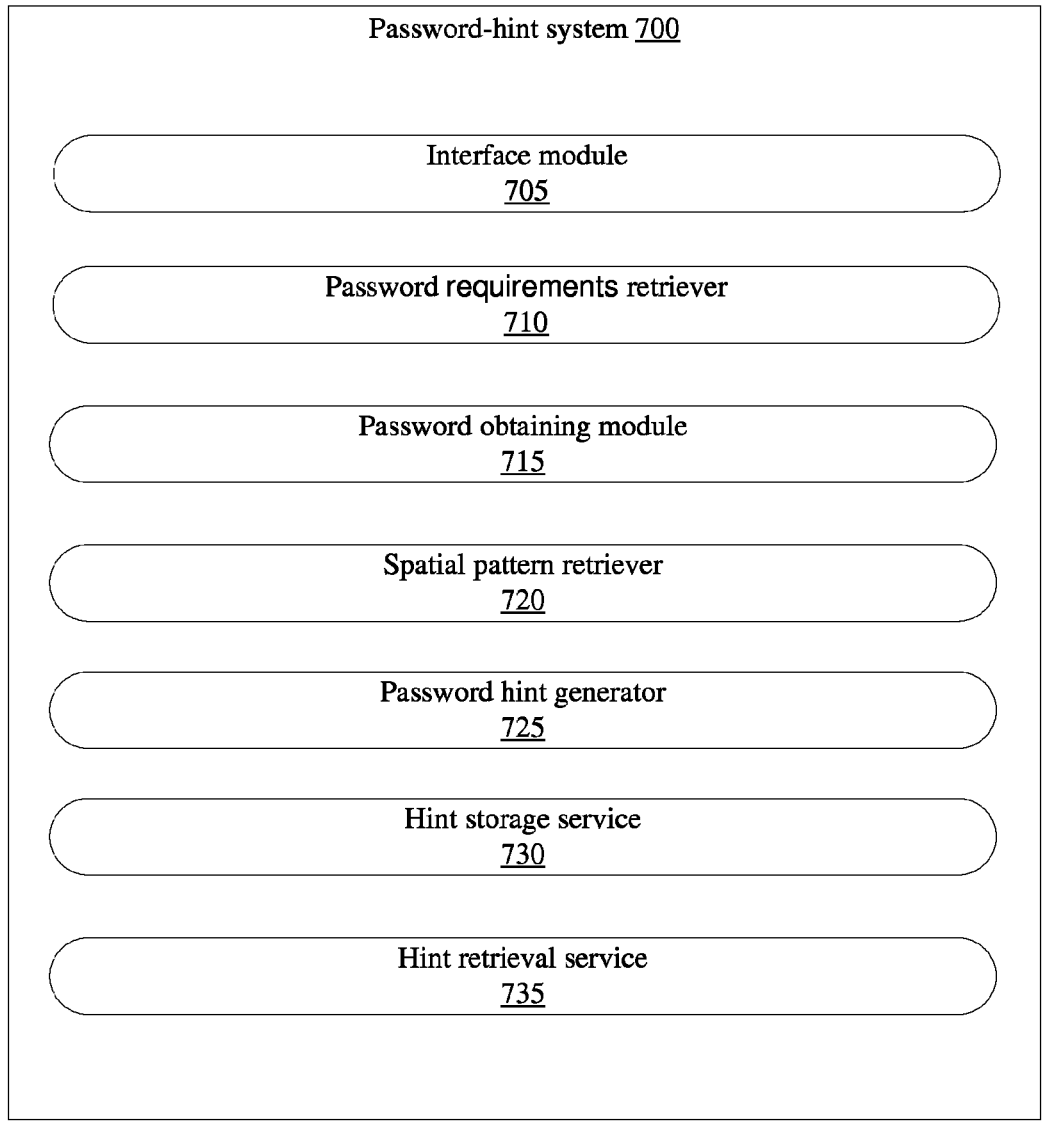
FIG. 7 is a block diagram illustrating various components of a password hint system, according to various embodiments.

FIG. 7 is a block diagram illustrating various components of a password hint system, according to various embodiments. Password hint system 700 may correspond to a hint application (e.g., 105 of FIG. 1), hint service (e.g., 115 of FIG. 1), or any combination thereof. In different embodiments, any of the components illustrated in FIG. 7 may be combined or further decomposed to perform various functions.

According to the illustrated embodiment, password hint system 700 includes interface module 705. Interface module 705 may comprise an API for invoking the password hint system. In various embodiments, the API may be invocable by software executing on the same machine and/or by software executing on a remote machine via a web service interface. In some embodiments, interface module 705 may be operable to display a graphical user interface and/or to communicate with other systems or components.

System 700 also includes password requirements retriever 710. In some embodiments, requirements retriever 710 may be configured to query a target authentication system for its password requirements. Requirements retriever 710 may be operable to retrieve password requirements from other or additional sources, such as by prompting the user for input or querying a database of known requirements.

System 700 includes password obtaining module 715. Password obtaining module 715 may be configured to generate, or otherwise obtain, high-entropy passwords that meet password requirements retrieved by the password policy retriever 710. As described herein, module 715 may generate a password by applying various random or pseudo-random number generation techniques to create new high-entropy passwords that meet given requirements. In some embodiments, rather than generating the passwords itself, module 715 may query a different system for the password (e.g., the target authentication system).

System 700 includes spatial pattern retriever 720. As described herein, retriever 720 may be configured to create and send a prompt (e.g., 2-dimensional grid) to the user and to receive and record a spatial pattern in response to the prompt.

System 700 further includes password hint generator 725. Generator 725 may be configured to generate, or otherwise obtain, a hint that includes an arrangement of characters where the characters of the password are located within the arrangement according to the received spatial pattern. As described herein, generator 725 may generate the hint by applying various random or pseudo-random number generation techniques. For example, in some embodiments, generator 725 may generate the hint by executing the method of FIG. 5.

System 700 includes hint storage service 730 and hint retrieval service 735. Storage service 730 may be usable to store password hints for different authentication systems (e.g., different websites). The storage service may be local to a single computer or invocable by multiple different clients over a network to store password hints. Hint retrieval service 735 may operate in conjunction with storage serve 730 to allow a user to retrieve hints that the user stored earlier.

As described above, for storage and retrieval services that serve multiple different users, the services may themselves require authentication. In some embodiments, authentication may be granted by providing a password, by confirming that the user is using pre-validated software or hardware (e.g., SIM card), or other methods.

Figure 8:
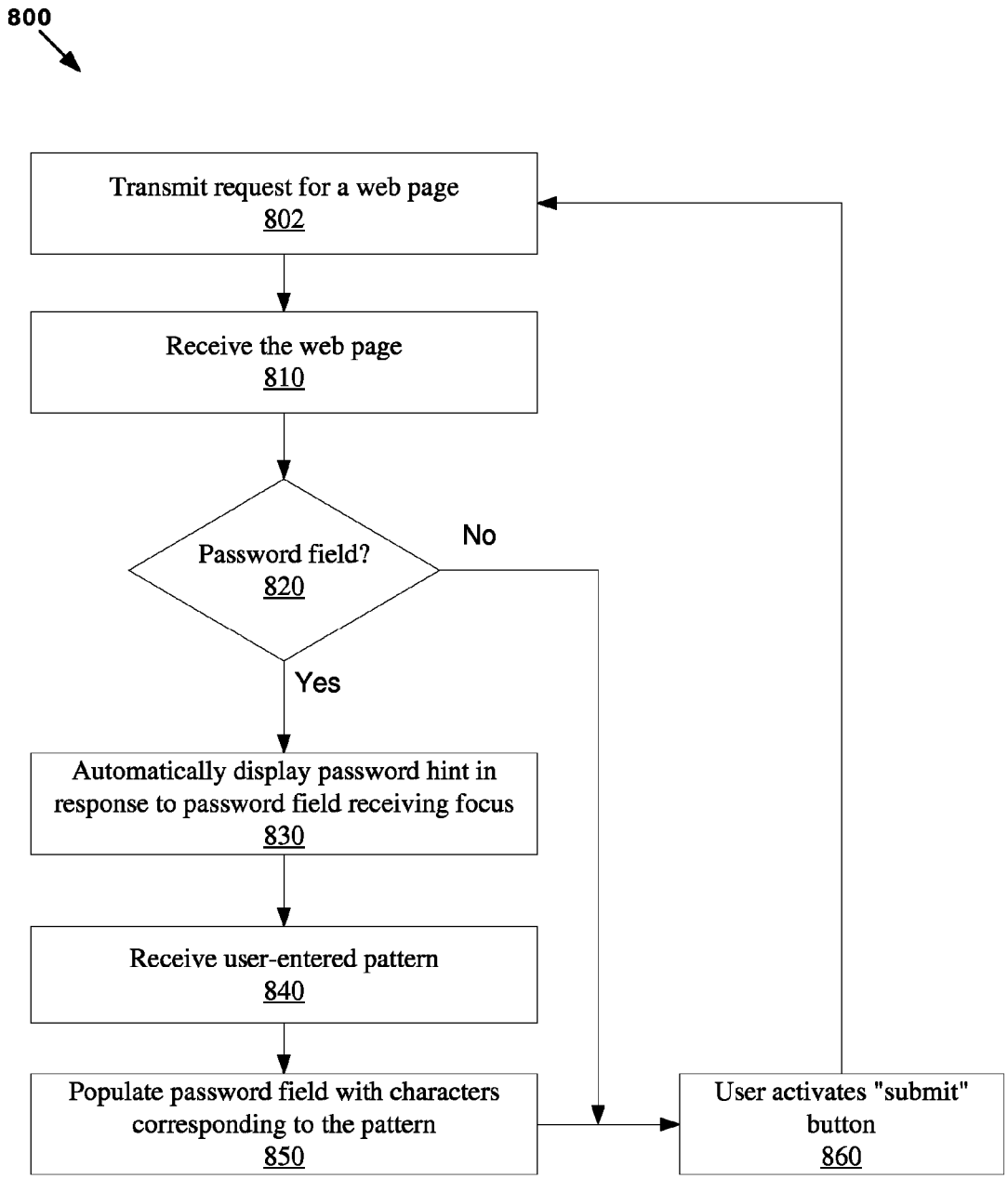
FIG. 8 is a flow chart illustrating a process 800 for using a password hint, according to some embodiments.

FIG. 8 is a flow chart illustrating a process 800 for using a password hint, according to some embodiments. Process 800 may begin in step 802, where a user uses a client device 100 to transmit to a web server for a web site a request for a web page (e.g., a web page that prompts the user to input a username and password to allow the user to gain full access to the web site). In step 810, the client device 100 receives the requested web page. In step 820 and a password hint application 105 executing on the client device 100 determines whether the received web page prompts the user to input a password into a password input field (e.g., textbox or an existing or new type of field indicating that it is not just text but password text). If the received web page does not prompt the user to input a password, then the process flows to step 860.

Otherwise, if the received web page prompts the user to input a password, then the process flows to step 830. In step 830, password hint application 105 automatically displays a password hint associated with the web site in response to the focus being set on the password input field and prompts the user to enter a spatial pattern. In other embodiments, in step 830, password hint application 105 does not automatically display the password hint, but rather may cause a selectable element (e.g., button) to be displayed adjacent to the password input field and displays the password hint and prompts the user to enter a spatial pattern in response to the user selecting the selectable element. Alternatively, the web page may embed such a selectable element referring to a default or selectable password hint system. In either case, it is assumed that the user has previously used password hint application 105 (or password hint service 115) to obtain a password hint for the web site in question and password hint application 105 has access to that password hint.

In step 840, password hint application 105 receives a spatial pattern input by the user. In step 850, password hint application automatically populates the password input field with the sequence of characters from the password hint that correspond to the spatial pattern received by the user. In this manner, if the user is able to remember the spatial pattern that he/she used to generate the password hint, then the user can gain access to the web site even if the user can not remember the password for the web site.

Figure 9:
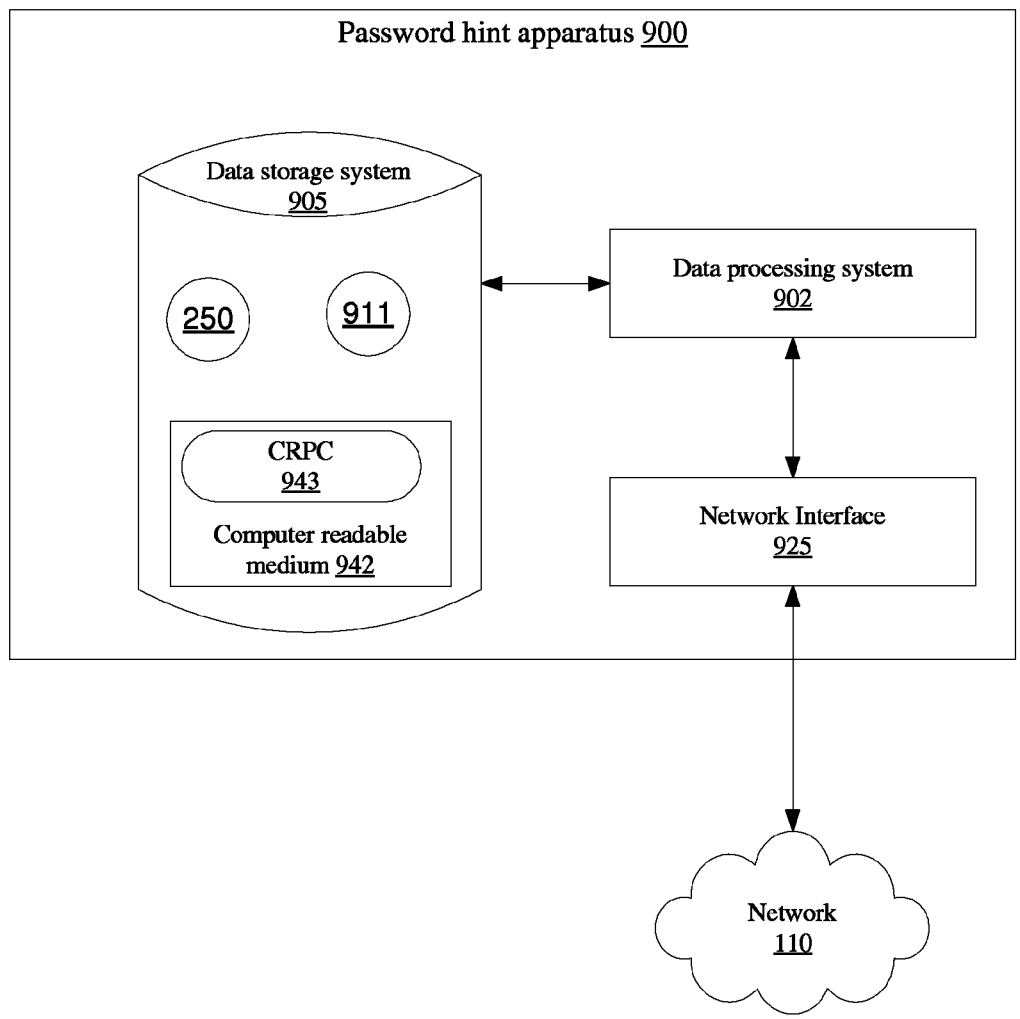
FIG. 9 is a block diagram illustrating a password hint apparatus for generating and providing password hints, according to some embodiments.

FIG. 9 illustrates a possible implementation for at least some components of the password hint system 105/115 according to some embodiments. As shown in FIG. 9, password hint system 105/115 may include: a data processing system 902, which may include one or more data processing devices each having one or more microprocessors and/or one or more circuits, such as an application specific integrated circuit (ASIC), Field-programmable gate arrays (FPGAs), etc; a network interface 925 for receiving messages (e.g., messages transmitted from a client 100 and/or more a network service 120) and transmitting messages; a data storage system 905, which may include one or more computer-readable mediums, such as non-volatile storage devices and/or volatile storage devices (e.g., random access memory (RAM)). As shown, data storage system 905 may be used to store password hints 250 and password requirement information 911.

In embodiments where data processing system 902 includes a microprocessor, a password hint computer program product is provided, which computer program product includes: computer readable program code 943, which implements a computer program, stored on a computer readable medium 942, such as, but not limited to, magnetic media (e.g., a hard disk), optical media (e.g., a DVD), memory devices (e.g., random access memory), etc. In some embodiments, computer readable program code 943 is configured such that, when executed by data processing system 902, code 943 causes the processing system to perform steps described above (e.g., steps describe above with reference to the flow charts shown in FIG. 3, 4 or 5).

In other embodiments, password hint system 105/115 may be configured to perform steps described above without the need for code 943. For example, data processing system 902 may consist merely of specialized hardware, such as one or more application-specific integrated circuits (ASICs). Hence, the features of the present invention described above may be implemented in hardware and/or software. For example, in some embodiments, the functional components of password hint system described above may be implemented by data processing system 902 executing computer instructions 943, by data processing system 902 operating independent of any computer instructions 943, or by any suitable combination of hardware and/or software.

FIG. 10 illustrates an embodiment of a computer readable program code (CRPC) 943. In the embodiment shown, CRPC 943 includes (1) a set of instructions 1005 for receiving password requirements, (2) a set of instructions 1010 for obtaining a password, (3) a set of instructions 1015 for prompting a user for a spatial pattern, (4) a set of instructions 1020 for receiving a spatial pattern, (5) a set of instructions 1025 for determining whether a received pattern meets one or more pattern requirements, (6) a set of instructions 1030 for generating a password hint, and (7) a set of instructions 1035 for storing the password hint and/or providing the password hint to a user.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a computer system, for obtaining a password hint, the method comprising:
receiving a spatial pattern from a user;
obtaining a password comprising a plurality of characters;
obtaining a password hint comprising an arrangement of characters;
electronically storing for the user the password hint at a storage location accessible via a communication network; and
providing the password hint to the user over the communication network without revealing the spatial pattern in response to detecting a request from the user for the password hint, wherein:
the arrangement of characters includes the plurality of characters of the password and additional characters, and
the plurality of characters of the password are located within the arrangement of characters according to the received spatial pattern;
wherein storing for the user the password hint comprises storing the password hint using a second network service;
wherein the request is transmitted from a mobile communication device having a subscriber identity module and is received at the network service; and
wherein providing the password hint to the user comprises granting access to the stored password hint responsive to authentication of the mobile communication device using the subscriber identity module.

2. The method of claim 1, further comprising receiving password requirements, wherein the step of obtaining the password comprises generating the password in accordance with the requirements.

3. The method of claim 2, further comprising:
receiving an indication of a network service for which the password is intended; and
requesting the password requirements from the indicated network service.

4. The method of claim 1, wherein storing the password hint comprises storing the password hint in association with a network service to which the password corresponds or in association with a target authentication system to which the password corresponds.

5. The method of claim 1, wherein the step of storing for the user the password hint comprises storing: (a) the arrangement of characters or (b) hint information from which the arrangement of characters can be generated.

6. The method of claim 1, wherein the step of storing for the user the password hint comprises storing the password hint in local storage on the mobile communication device.

7. The method of claim 1, further comprising:
using a graphical image to prompt the user for the spatial pattern;
wherein the password hint comprises the graphical image.

8. The method of claim 7, wherein the password hint comprises the arrangement of characters superimposed on the graphical image.

9. The method of claim 1, further comprising providing the password hint to the user automatically in response to detecting that the user is being prompted to input a password associated with the password hint.

10. The method of claim 1, further comprising: in response to obtaining the password, automatically using the password to authenticate the user to a network service associated with the password.

11. The method of claim 1, wherein the computer system is part of a mobile communication device.

12. The method of claim 1, further comprising:
receiving an initial spatial pattern before receiving said first recited spatial pattern;
determining that the initial spatial pattern does not meet one or more pattern requirements; and
in response to determining that the initial spatial pattern does not meet the one or more pattern requirements, prompting the user to input a new spatial pattern.

13. The method of claim 1, wherein the step of obtaining the password occurs after the step of obtaining the password hint, and the step of obtaining the password comprises: determining the characters of the password hint that correspond to the spatial pattern and setting the password such that the characters of the password comprise the determined characters of the password hint that correspond to the spatial pattern.

14. An apparatus for obtaining a password hint, the apparatus comprising:
   a processor;
   memory coupled to the processor, wherein the memory stores program instructions that when executed by the processor cause the process to perform operations comprising:
   receiving a spatial pattern from a user;
   obtaining a password comprising a plurality of characters;
   obtaining a password hint comprising an arrangement of characters;
   electronically storing for the user the password hint at a storage location accessible via a communication network; and
   providing the password hint to the user over the communication network without revealing the spatial pattern in response to detecting a request from the user for the password hint, wherein
   the arrangement of characters includes the plurality of characters of the password and additional characters, and
   the plurality of characters of the password are located within the arrangement of characters according to the received spatial pattern;
   wherein storing for the user the password hint comprises storing the password hint using a second network service;
   wherein the request is transmitted from a mobile communication device having a subscriber identity module and is received at the network service; and
   wherein providing the password hint to the user comprises granting access to the stored password hint responsive to authentication of the mobile communication device using the subscriber identity module.

15. The apparatus of claim 14, wherein the operations further comprise:
   receiving password requirements; and
   obtaining the password comprises instructions for generating the password in accordance with the requirements.

16. The apparatus of claim 14, wherein the operations further comprise storing the password hint in association with a network service to which the password corresponds or in association with a target authentication system to which the password corresponds.

17. The apparatus of claim 14, wherein the operations further comprise storing the password hint in local storage on the mobile communication device.

18. The apparatus of claim 14, wherein the operations further comprise:
   providing the password hint to the user automatically in response to detecting that the user is being prompted to input a password associated with the password hint.

19. The apparatus of claim 14, wherein the operations further comprise using a graphical image to prompt the user for the spatial pattern, wherein the password hint comprises the arrangement of characters superimposed on the graphical image.

20. The apparatus of claim 14, wherein the apparatus is or is part of the mobile communication device.

* * * * *